(12) United States Patent
Shen

(10) Patent No.: US 8,171,332 B2
(45) Date of Patent: May 1, 2012

(54) INTEGRATED CIRCUIT WITH REDUCED ELECTROMAGNETIC INTERFERENCE INDUCED BY MEMORY ACCESS AND METHOD FOR THE SAME

(75) Inventor: Meng-Wei Shen, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 522 days.

(21) Appl. No.: 12/464,291

(22) Filed: May 12, 2009

(65) Prior Publication Data
US 2010/0293405 A1  Nov. 18, 2010

(51) Int. Cl.
G06F 1/00 (2006.01)
G06F 1/12 (2006.01)
G06F 13/42 (2006.01)
G06F 1/04 (2006.01)
G06F 5/06 (2006.01)
H04L 5/00 (2006.01)
H04L 7/00 (2006.01)

(52) U.S. Cl. ......... 713/500; 713/401; 713/501; 713/600

(58) Field of Classification Search .................. 713/401, 713/500, 501, 600
See application file for complete search history.

(56) References Cited

U.S. PATENT DOCUMENTS

| | | | | |
|---|---|---|---|---|
| 5,872,807 | A * | 2/1999 | Booth et al. | 375/130 |
| 6,404,834 | B1 * | 6/2002 | Hardin et al. | 375/376 |
| 6,559,698 | B1 * | 5/2003 | Miyabe | 327/157 |
| 6,823,022 | B1 * | 11/2004 | Fullerton et al. | 375/285 |
| 7,187,705 | B1 * | 3/2007 | Richmond | 375/130 |
| 7,505,542 | B1 * | 3/2009 | Lesea | 375/374 |
| 7,701,997 | B2 * | 4/2010 | Tal et al. | 375/132 |
| 7,813,410 | B1 * | 10/2010 | Akyildiz | 375/130 |
| 7,917,796 | B2 * | 3/2011 | Wilson | 713/500 |
| 2003/0081653 | A1 * | 5/2003 | Hardin et al. | 375/130 |
| 2004/0081114 | A1 * | 4/2004 | Jiang et al. | 370/320 |
| 2005/0028020 | A1 * | 2/2005 | Zarrieff et al. | 713/600 |
| 2006/0036817 | A1 * | 2/2006 | Oza et al. | 711/155 |
| 2006/0056562 | A1 * | 3/2006 | Chen et al. | 375/376 |
| 2006/0106980 | A1 * | 5/2006 | Kobayashi et al. | 711/113 |
| 2006/0213973 | A1 * | 9/2006 | Chan et al. | 235/380 |
| 2007/0207831 | A1 * | 9/2007 | Tinsley et al. | 455/556.1 |

(Continued)

FOREIGN PATENT DOCUMENTS

JP  2001014056 A  *  1/2001

(Continued)

OTHER PUBLICATIONS

"NNRD445175: Efficient Spread Spectrum for LCD Panel", May 1, 2001, IBM, IBM Technical Disclosure Bulletin, Iss. 445, p. 879.*
Zigliotto, M.; Trzynadlowski, A.M.; , "Effective random space vector modulation for EMI reduction in low-cost PWM inverters," Power Electronics and Variable Speed Drives, 1998. Seventh International Conference on (Conf. Publ. No. 456) , pp. 163-168, Sep. 21-23, 1998.*

(Continued)

*Primary Examiner* — Faisal M Zaman
(74) *Attorney, Agent, or Firm* — Thomas|Kayden

(57) ABSTRACT

The invention provides an integrated circuit with reduced electromagnetic interference induced by memory access. The integrated circuit includes a random code generator, a request receiver and a memory unit. The random code generator generates a plurality of random codes according to a predetermined delay parameter. The request receiver obtains an input clock signal according to a plurality of data requests and spreads the spectrum of the input clock signal based on the random codes to derive a non-periodic output clock signal. The memory unit accesses image data to be displayed in response to the data requests and the output clock signal.

8 Claims, 5 Drawing Sheets

U.S. PATENT DOCUMENTS

| | | | |
|---|---|---|---|
| 2008/0046775 A1* | 2/2008 | Chien | 713/500 |
| 2008/0100365 A1* | 5/2008 | Kaizuka | 327/291 |
| 2008/0198945 A1* | 8/2008 | Egan et al. | 375/296 |
| 2008/0215907 A1* | 9/2008 | Wilson | 713/500 |
| 2008/0303572 A1* | 12/2008 | Chang | 327/164 |
| 2009/0016413 A1* | 1/2009 | Shen et al. | 375/149 |
| 2009/0074030 A1* | 3/2009 | Agoston et al. | 375/130 |

FOREIGN PATENT DOCUMENTS

| | | | |
|---|---|---|---|
| JP | 2006101549 A | * | 4/2006 |
| JP | 2006333174 A | * | 12/2006 |
| JP | 2007150560 A | * | 6/2007 |
| JP | 2007225863 A | * | 9/2007 |
| JP | 2011199528 A | * | 10/2011 |

OTHER PUBLICATIONS

Jonghoon Kim; Dong Gun Kam; Pil Jung Jun; Joungho Kim; , "Spread spectrum clock Generator with delay cell array to reduce electromagnetic interference," Electromagnetic Compatibility, IEEE Transactions on , vol. 47, No. 4, pp. 908-920, Nov. 2005.*

Ho, E.N.Y.; Mok, P.K.T.; , "Ramp signal generation in Voltage mode CCM Random switching Frequency Buck converter for conductive EMI reduction," Custom Integrated Circuits Conference (CICC), 2010 IEEE , pp. 1-4, Sep. 19-22, 2010.*

\* cited by examiner

INTEGRATED CIRCUIT WITH REDUCED ELECTROMAGNETIC INTERFERENCE INDUCED BY MEMORY ACCESS AND METHOD FOR THE SAME

BACKGROUND OF THE INVENTION

1. Field of the Invention

The invention relates to memory access and more particularly to an integrated circuit (IC) with reduced electromagnetic interference induced by memory access.

2. Description of the Related Art

A mobile electronic device, such as a cell phone or a personal digital assistant (PDA), may contain several integrated circuits with different functionalities. For example, the mobile electronic device may include a display driver integrated circuit for driving a panel, e.g., a liquid crystal display panel.

For a display driver integrated circuit, an embedded memory is used as a frame buffer for storing image data to be displayed. Typically, a static random access memory (SRAM) is used due to its advantages of having low power consumption, high speeds and simple operations. The image data is subsequently displayed on a panel With development of mobile electronic devices, demand for mobile electronic devices with various multimedia applications have increased, e.g., animation or multimedia streaming display. Thus, increasing the frequency required to refresh the embedded memory with updated image data. However, periodic and high frequency refresh operations of embedded memories usually result in power loss and increased electromagnetic interference (EMI) radiated from the driver integrated circuit. Since some components of the mobile electronic device are sensitive and susceptible to EMI radiation, e.g., a wireless communication module, those components may function improperly or fail to operate if electromagnetic interference (EMI) is too high.

Therefore, an improved method is desired to lower electromagnetic interference (EMI) levels emitted from the driver integrated circuit during memory access operations.

BRIEF SUMMARY OF THE INVENTION

The invention provides an integrated circuit with reduced electromagnetic interference induced by memory access. The integrated circuit includes a random code generator, a request receiver and a memory unit. The random code generator generates a plurality of random codes according to a predetermined delay parameter. The request receiver is coupled to the random code generator for obtaining an input clock signal according to a plurality of data requests and spreading the spectrum of the input clock signal based on the random codes to derive a non-periodic output clock signal. The memory unit accesses image data to be displayed in response to the data requests and the output clock signal. Thus, the frequency spectrum of the output clock signal is wider than that of the input clock signal.

In addition, the invention further provides a method for reducing electromagnetic interference in an integrated circuit. The electromagnetic interference is generated during memory access operations. The method includes the steps of: generating a plurality of random codes according to a predetermined delay parameter; obtaining an input clock signal according to a plurality of data requests; spreading the spectrum of the input clock signal based on the random codes to derive a non-periodic output clock signal; and accessing image data to be displayed from a memory unit in response to the data requests and the output clock signal. Thus, the frequency spectrum of the output clock signal is wider than that of the input clock signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
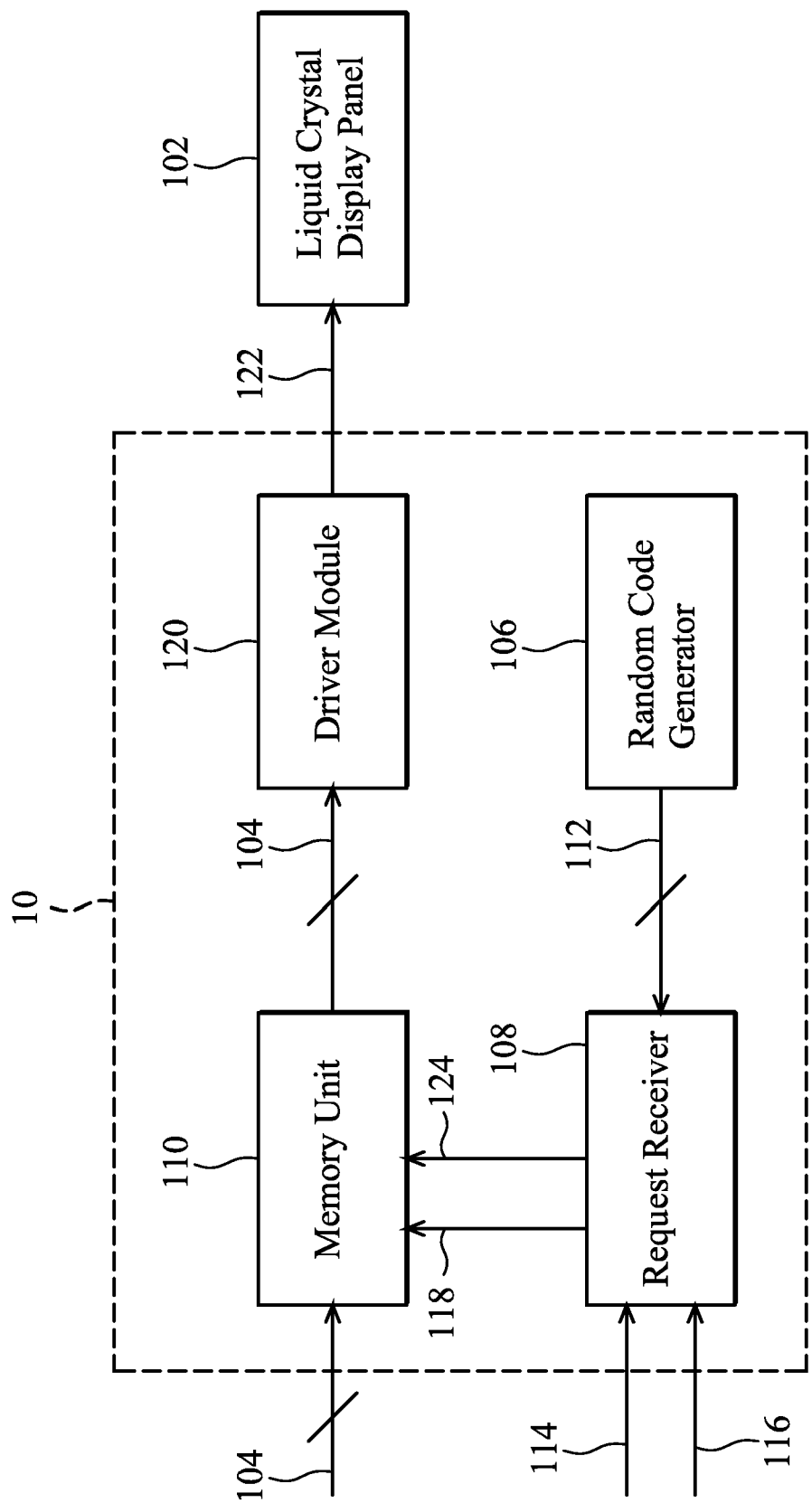
FIG. 1 is a block diagram illustrating an integrated circuit with reduced electromagnetic interference induced by memory access according to an embodiment of the invention.

FIG. 1 is a block diagram illustrating an integrated circuit 10 with reduced electromagnetic interference induced by memory access according to an embodiment of the invention. In this embodiment, the integrated circuit 10 is a display driver provided for driving a liquid crystal display panel 102 to display image data 104.

As shown in FIG. 1, the integrated circuit 10 comprises a random code generator 106, a request receiver 108, a driver module 120 and a memory unit 110.

In one embodiment, it is assumed that an SRAM is provided for the integrated circuit 10, and thus the request receiver 108 may receive data requests issued from outside circuits, such as read requests 114 or write requests 116. Each read request or write request respectively specify a read operation or a write operation for the memory unit 110. For example, based on sequential write requests 116, the request receiver 108 will generate an output clock signal 118 to perform corresponding write operations on the memory unit 110. Moreover, the integrated circuit 10 may be one single chip incorporated into a mobile electronic device. Also, the random code generator 106 is a pseudo random code generator.

As described above, since the refresh frequencies for multimedia applications are often fixed and high, the periodic output clock signal 118 has become a source for EMI during memory access operations. Thus, the use of the request receiver 108 provides a method to vary the frequency of the periodic clock signal during memory access.

For example, when a series of write requests 116 are received, the request receiver 108 generates an input clock signal (not shown) corresponding to the write requests 116. The random code generator 106 then generates a plurality of random codes 112 according to a predetermined delay parameter. After, the request receiver 108 obtains the random codes 112 from the random code generator 106. The frequency spectrum of the input clock signal is spread uniformly based on the random codes 112, so as to derive a non-periodic output clock signal 118. More specifically, the request receiver 108 temporally changes the duty cycle of the input clock signal by shifting the rising edge or falling edge of the input clock signal time-to-time. Note that the process of generating the output clock signal 118 will be described herein below in detail with reference to FIGS. 2 and 3. Subsequently, the image data to be displayed 104 is written into the memory unit 110 in response to the write requests 116 and the output clock signal 118. The driver module 120 coupled to the memory unit 110 scans the memory unit 110 and generates a display signal 122 in response thereto.

Figure 2:
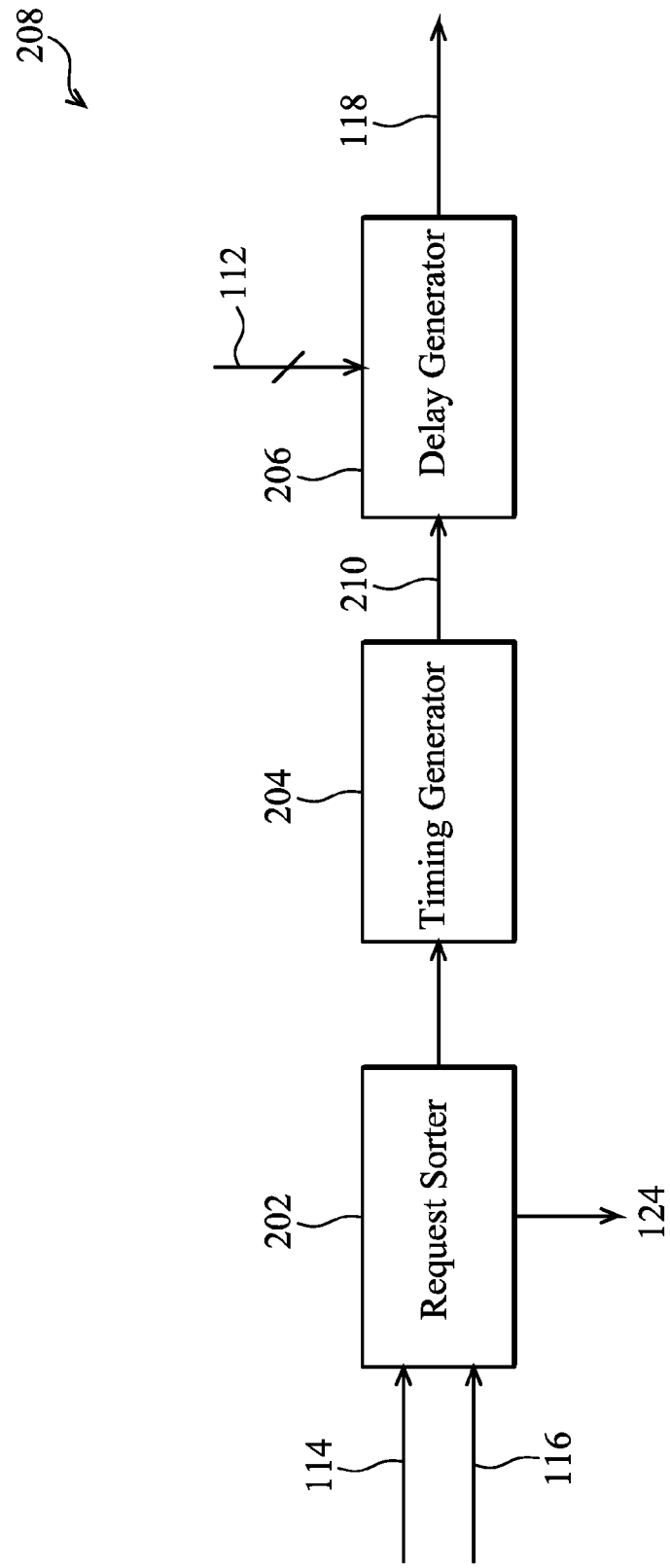
FIG. 2 is a block diagram illustrating a request receiver in accordance with the embodiment of FIG. 1.

FIG. 2 is a block diagram illustrating a request receiver 208 in accordance with the embodiment of FIG. 1. As shown in FIG. 2, the request receiver 208 comprises a request sorter 202, a timing generator 204 and a delay generator 206.

Referring to FIGS. 1 and 2, the request sorter 202 provides a read flag or a write flag 124 according to the data requests and sorts the data requests being routed to the memory unit 110. Specifically, the read flag is indicative of executing reading of the memory unit 110 and the write flag is indicative of executing writing to the memory unit 110.

The timing generator 204 is coupled to the request sorter 202 for generating an input clock signal 210 according to the sorted data requests and the corresponding flag. The delay generator 206 is coupled to the timing generator 204 for generating a plurality of phase delays respectively corresponding to each random code 112 from the random code generator 106 of FIG. 1. In detail, the random codes 112 make it possible to individually delay each pulse of the input clock signal 210 by each phase delay, thereby spreading the fundamental and high-order harmonics of the periodic input clock signal 210 over the whole frequency spectrum.

Figure 3:
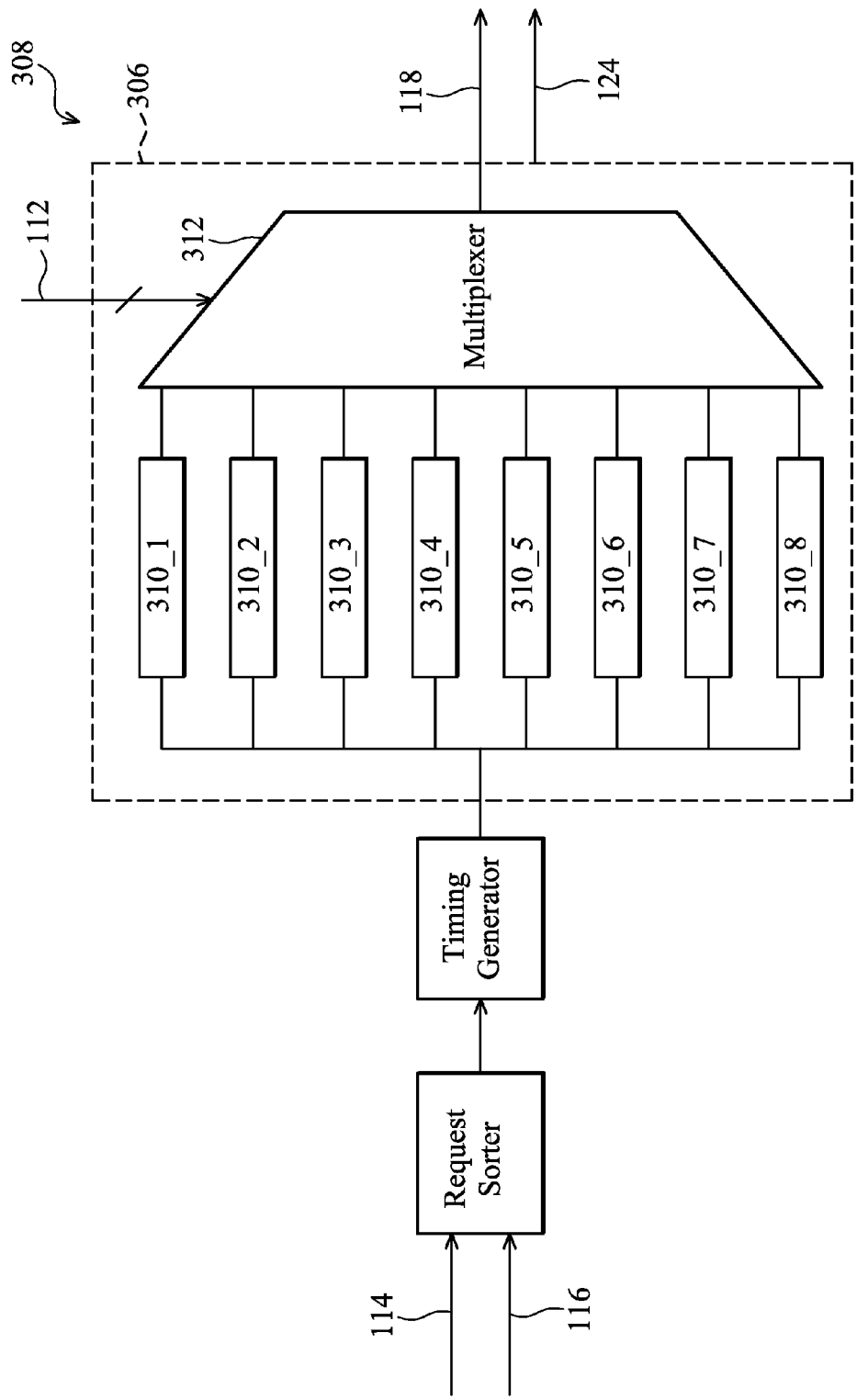
FIG. 3 is a block diagram illustrating another request receiver in accordance with the embodiment of FIG. 1.

FIG. 3 is a block diagram illustrating another request receiver 308 in accordance with the embodiment of FIG. 1. In this illustrated embodiment, a programmable delay generator 306 comprises a multiplexer 312 and a plurality of delay cells (referred to as 310_1, 310_2 . . . ), thereby allowing multiple phase delays.

For example, assuming the predetermined delay parameter is a constant, equal to 3, thus a 3-bit delay scheme is used for providing eight different phase delays. That is, as shown in FIG. 3, an output from the delay cell 310_1 specifies one unit phase delay, an output from the delay cell 310_2 specifies two unit phase delays, and an output from the delay cell 310_3 specifies three unit phase delays, and so on. More specifically, each pulse of the input clock signal is preferably passed to each delay cell and delayed by a corresponding latency or delay time. In addition, the multiplexer 312 is an 8 to 1 multiplexer. The random code generator 106 supplies a specific random code 112 to determine which delayed pulse input to the multiplexer 312 will be an output pulse of the output clock signal 118. Further, the random codes 112 cause the output clock signal 118 to be non-periodic.

Figure 4:
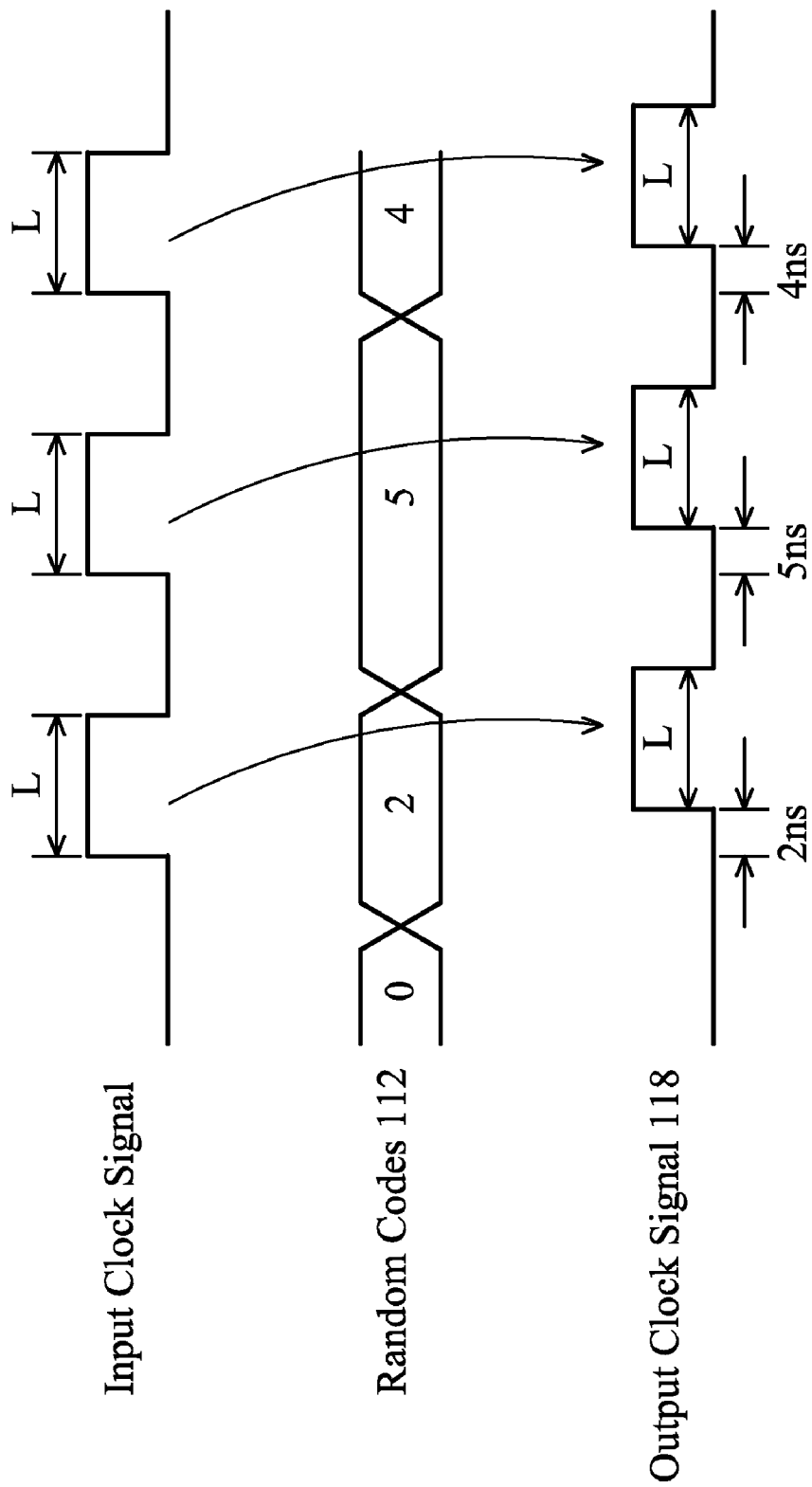
FIG. 4 is a timing chart illustrating the input clock signal, the random codes and the output clock signal as shown in FIG. 3.

FIG. 4 is a timing chart of the input clock signal, the random codes 112 and the output clock signal 118 as shown in FIG. 3. It is assumed that one unit phase delay is equal to one nanosecond (ns). Further, the input clock signal has pulse width L equal to 20 ns. During operation, the output clock signal 118 is identified by shifting the rising edge of each pulse in the input clock signal according to the random codes 112. In this manner, the rising edge of each pulse in the output clock signal 118 is chronologically behind that in the input clock signal by various random codes 112. As a result, the delay generator 306 produces the output clock signal 118 having a train of pulses with different duty cycles. The EMI energy for the input clock signal is spread in a random manner over a relatively wide frequency band.

Note that in other embodiments, other implementations, such as sigma delta modulation (SDM) methods, may be applied to reduce the EMI energy levels from the input clock signal.

From the aforementioned description, the frequency spectrum of the output clock signal 118 is wider than that of the input clock signal and the EMI emissions due to memory access are at a substantially reduced energy level.

Figure 5:
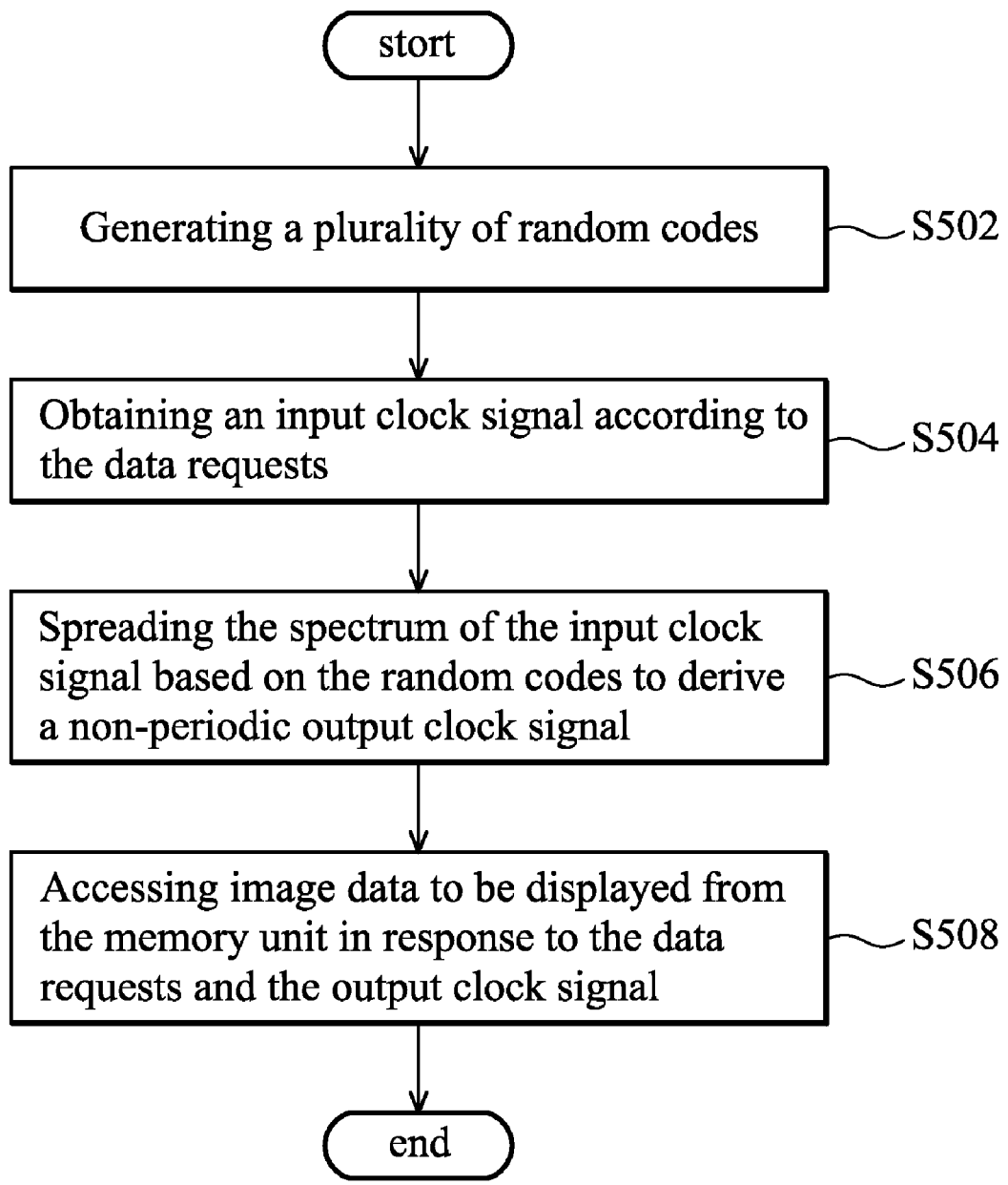
FIG. 5 is a flowchart illustrating a method for reducing electromagnetic interference in an integrated circuit according to an embodiment of the invention.

FIG. 5 is a flowchart illustrating a method for reducing electromagnetic interference in an integrated circuit according to an embodiment of the invention. According to the embodiment, the electromagnetic interference is generated during operation of accessing a memory unit as shown in FIG. 1.

Referring to FIGS. 1 and 5, when the request receiver 108 receives a plurality of data requests, a plurality of random codes, such as read requests or write requests, are generated by the random code generator 106 according to a predetermined delay parameter (step S502). In an embodiment, assuming the predetermined delay parameter is a constant determined to be 3, a 3-bit delay scheme is used for providing eight different phase delays, as shown in FIG. 4. The random codes are subsequently passed to the request receiver 108. Next, the request receiver 108 generates an input clock signal in accordance with the data requests (step S504). Additionally, the request receiver 108 spreads the spectrum of the input clock signal based on the random codes, so as to provide an output clock signal 118 of a non-periodic nature (step S506). Note that the operation of generating the output clock signal 118 is illustrated in FIGS. 1-3, and hence, further description thereof is omitted. The frequency spectrum of the resulting output clock signal 118 is spread over a wider frequency band than that of the input clock signal. Then, the image data to be displayed 104 is written to/read from the memory unit 110, in response to the write requests or read requests and the output clock signal (step S508).

The invention discloses a method for reducing electromagnetic interference during memory access operations, e.g., writing data into an SRAM, and an integrated circuit using the same. Moreover, the generation of a spread spectrum clock signal used for accessing the SRAM involves varying the frequency of the original clock signal in a periodic manner according to different random codes, so as to achieve reduction of the EMI energy level.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An integrated circuit with reduced electromagnetic interference induced by memory access, comprising:

a random code generator for generating a plurality of random codes according to a predetermined delay parameter;

a request receiver coupled to the random code generator for obtaining an input clock signal according to a plurality of data requests and spreading the spectrum of the input clock signal based on the random codes to derive a non-periodic output clock signal;

a memory unit for accessing image data to be displayed in response to the data requests and the output clock signal, wherein the frequency spectrum of the output clock signal is wider than that of the input clock signal, and wherein the request receiver comprises:

a request sorter for providing a read flag or a write flag according to the data requests and sorting the data requests being routed to the memory unit, wherein the read flag is indicative of executing reading of the memory unit and the write flag is indicative of executing writing to the memory unit;

a timing generator coupled to the request sorter for generating the input clock signal according to the data requests and the corresponding flag; and a delay generator coupled to the timing generator for generating a plurality of phase delays respectively corresponding to each random code and deriving the output clock signal applied to the memory unit by individually delaying each pulse of the input clock signal by each phase delay.

2. The integrated circuit as claimed in claim 1, further comprising:

a driver module coupled to the memory unit for scanning the memory unit and generating a display signal in response thereto.

3. The integrated circuit as claimed in claim 2, wherein the integrated circuit is a display driver for a liquid crystal display panel, wherein the liquid crystal display panel displays the image data according to the display signal.

4. The integrated circuit as claimed in claim 3, wherein the integrated circuit is incorporated into a mobile electronic device.

5. A method for reducing electromagnetic interference in an integrated circuit, wherein the electromagnetic interference is induced by memory access, comprising:

generating a plurality of random codes according to a predetermined delay parameter;

obtaining an input clock signal according to a plurality of data requests;

spreading the spectrum of the input clock signal based on the random codes to derive a non-periodic output clock signal, wherein the step of spreading the spectrum of the input clock signal comprises:

providing a read flag or a write flag according to the data requests and sorting the data requests being routed to the memory unit, wherein the read flag is indicative of executing reading of the memory unit and the write flag is indicative of executing writing to the memory unit;

generating the input clock signal according to the data requests and the corresponding flag;

generating a plurality of phase delays respectively corresponding to each random code; and deriving the output clock signal applied to the memory unit by individually delaying each pulse of the input clock signal by each phase delay; and accessing image data to be displayed from a memory unit in response to the data requests and the output clock signal, wherein the frequency spectrum of the output clock signal is wider than that of the input clock signal.

6. The method as claimed in claim 5, further comprising:

scanning the memory unit and generating a display signal in response thereto.

7. The method as claimed in claim 6, wherein the integrated circuit is a display driver for a liquid crystal display panel, wherein the liquid crystal display panel displays the image data according to the display signal.

8. The method as claimed in claim 7, wherein the integrated circuit is incorporated into a mobile electronic device.

* * * * *